US011463157B2

(12) United States Patent
Maisonnat et al.

(10) Patent No.: US 11,463,157 B2
(45) Date of Patent: Oct. 4, 2022

(54) METHOD AND DEVICE FOR RECEIVING AN ADS-B MESSAGE VIA A SATELLITE

(71) Applicant: AIRBUS DEFENCE AND SPACE SAS, Toulouse (FR)

(72) Inventors: Thibault Maisonnat, Toulouse (FR); Benjamin Gadat, Toulouse (FR)

(73) Assignee: AIRBUS DEFENCE AND SPACE SAS, Toulouse (FR)

(*) Notice: Subject to any disclaimer, the term of this patent is extended or adjusted under 35 U.S.C. 154(b) by 0 days.

(21) Appl. No.: 17/618,736

(22) PCT Filed: Jun. 10, 2020

(86) PCT No.: PCT/EP2020/066059
§ 371 (c)(1),
(2) Date: Dec. 13, 2021

(87) PCT Pub. No.: WO2020/249604
PCT Pub. Date: Dec. 17, 2020

(65) Prior Publication Data
US 2022/0209849 A1    Jun. 30, 2022

(30) Foreign Application Priority Data

Jun. 14, 2019 (FR) ..................................... 1906354

(51) Int. Cl.
*H04B 7/185* (2006.01)
*H04L 7/00* (2006.01)
*H04L 1/00* (2006.01)

(52) U.S. Cl.
CPC ..... *H04B 7/18506* (2013.01); *H04B 7/18513* (2013.01); *H04L 1/0054* (2013.01); *H04L 1/0061* (2013.01); *H04L 7/0054* (2013.01)

(58) Field of Classification Search
CPC ............ H04B 7/18506; H04B 7/18513; H04L 7/0054; H04L 1/0061; H04L 1/0054
See application file for complete search history.

(56) References Cited

U.S. PATENT DOCUMENTS 9,791,562 B2 * 10/2017 Stayton .................... H04L 5/02
2018/0269955 A1   9/2018 Dyson

FOREIGN PATENT DOCUMENTS

EP    2 365 355 A1   9/2011
EP    2 738 972 A2   6/2014
(Continued)

OTHER PUBLICATIONS

English Translation of International Search Report for PCT/EP2020/066059, dated Sep. 14, 2020, 2 pages.
(Continued)

*Primary Examiner* — Jianye Wu
(74) *Attorney, Agent, or Firm* — Nixon & Vanderhye P.C.

(57) ABSTRACT

A method for receiving an ADS-B message is disclosed including a synchronisation phase for detecting the start of the message and a decoding phase for recovering a bit stream corresponding to a block of data in the message. The synchronisation phase is based on determining a sequence of log-likelihood ratios having the greatest likelihood of corresponding to a sequence of symbols expected from a preamble of the message. Each log-likelihood ratio corresponds to a ratio between the respective probabilities that a symbol of the signal received corresponds to one of two possible values for a symbol. The decoding phase applies a belief propagation algorithm to a sequence of log-likelihood ratios respectively associated with the symbols in the block of data in the message, with an optimised parity matrix of the cyclic redundancy code of the message.

9 Claims, 10 Drawing Sheets

(56) References Cited

FOREIGN PATENT DOCUMENTS

Figure 1:
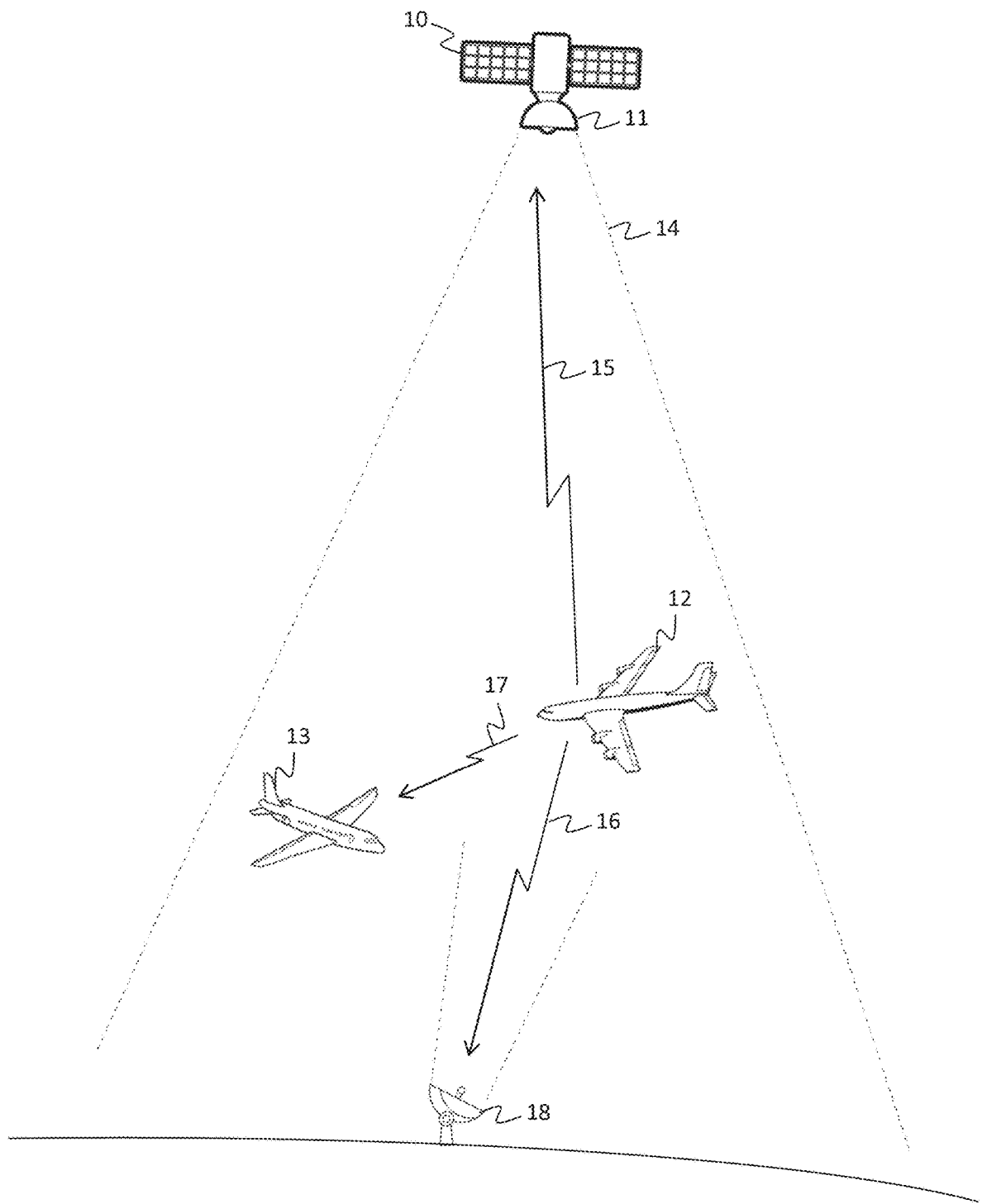

| EP | 2 738 972 A3 | 6/2017 | |
|---|---|---|---|
| WO | 2008/134255 A2 | 11/2008 | |
| WO | 2008/134255 A3 | 11/2008 | |
| WO | WO-2012084956 A2 * | 6/2012 | ......... H04L 27/0006 |

OTHER PUBLICATIONS

French International Search Report and Written Opinion of the ISA for PCT/EP2020/066059, dated Sep. 14, 2020, 12 pages.

* cited by examiner

METHOD AND DEVICE FOR RECEIVING AN ADS-B MESSAGE VIA A SATELLITE

CROSS REFERENCE TO RELATED APPLICATIONS

The present application is a National Phase of International Application Number PCT/EP2020/066059 filed Jun. 10, 2020, which designated the U.S. and claims priority benefits from French Application Number FR 1906354 filed Jun. 14, 2019, the entire contents of each of which are hereby incorporated by reference.

FIELD OF THE INVENTION

The present invention belongs to the field of air traffic surveillance by satellite. In particular, the invention relates to a method and a device for receiving from space ADS-B (acronym for "Automatic Dependent Surveillance-Broadcast") messages emitted by aircrafts.

PRIOR ART

ADS-B is a surveillance system for air traffic control. Each aircraft equipped with ADS-B on-board equipment can periodically emit (for example every second) an ADS-B message which mainly contains an identifier, a position and a heading of the aircraft.

The ADS-B system was originally designed for communication between an aircraft and a ground station, or to surrounding aircrafts. The deployment of ground stations is impossible in oceanic areas and very delicate in certain land areas that are difficult to access or potentially having security risks. The need to ensure a homogeneous quality of surveillance throughout the flight path of the aircraft leads to considering the collection of ADS-B messages from space, which will also allow to open the new routes necessary to take account of the growth in air traffic.

The attenuation undergone by ADS-B messages received via a satellite is significant and causes a significant negative impact on the Signal-to-Noise Ratio (SNR). In the event of a collision of several ADS-B messages, that is to say when several ADS-B messages are emitted simultaneously by aircrafts present in the beam of a satellite antenna, conventional receiving devices are generally not capable of detecting and/or decoding said messages because the signal-to-noise ratio for each message is too low. This makes conventional devices unreliable and not applicable for surveillance means involving the safety of persons.

It is therefore necessary to set up specific means for detecting and collecting ADS-B messages. The use of a multi-beam antenna limits the effects of interference within each beam, because a reduction in the dimensions of a beam leads to a decrease in the number of collisions between messages emitted simultaneously by aircrafts present in the beam in question. However, with conventional receiving devices, the high number of beams to be used is unsatisfactory.

Patent applications WO 2008/134255 A2 and EP 2738972 A2 describe methods for receiving an ADS-B message. However, the performance of these methods is not sufficient to detect and synchronize an ADS-B message when the SNR level is particularly low.

DESCRIPTION OF THE INVENTION

The purpose of the present invention is to overcome all or part of the disadvantages of the prior art, in particular those set out above, by proposing a solution allowing to synchronize and decode an ADS-B message transported by a radio signal for which the signal-to-noise ratio is particularly low.

To this end, and according to a first aspect, provision is made by the present invention of a method for receiving an automatic dependent surveillance-broadcast (ADS-B) message. Such a message is carried by a radio signal and includes a preamble and a block of data encoded by symbols modulated by pulse position. The block of data includes a cyclic redundancy check (CRC) code. The reception method includes a synchronization phase for detecting the start of the message, and a decoding phase for recovering a bit stream corresponding to the block of data in the message.

The synchronization phase includes:
  a sampling of the radio signal with a sampling frequency at least equal to twice the emission frequency of the symbols of the message,
  for each sample of a predetermined number of successive samples, a determination of a sequence of log-likelihood ratios, each log-likelihood ratio corresponding to a ratio between the respective probabilities that a symbol of the signal received corresponds to one of two possible values for a symbol, each sequence being determined by assuming that said sample corresponds to the start of the message,
  a selection of candidate sequences based on the values of log-likelihood ratios of said sequences thus determined, each candidate sequence being associated with a candidate sample which may correspond to the start of the message,
  for each selected candidate sequence, a calculation of a likelihood value between said candidate sequence and a sequence of symbols expected for the preamble,
  a determination based on the likelihood values thus calculated, of a sample, called the "starting sample", corresponding to the start of the message.

The decoding phase includes:
  a determination, from the starting sample, of a sequence of log-likelihood ratios associated respectively with the symbols of the block of data in the message,
  an ordering of said sequence of log-likelihood ratios associated with the symbols of the block of data in ascending order in absolute value,
  a permutation of the columns of a parity matrix of the cyclic redundancy check code, said permutation being carried out in a coherent manner with the permutations carried out to order the sequence of log-likelihood ratios, in order to obtain a matrix called "permuted matrix",
  a transformation of the permuted matrix by reduction in scaled form of a sub-part of said permuted matrix, in order to obtain a matrix called "transformed matrix",
  a reverse permutation of the columns of the transformed matrix to return the columns to their initial order, in order to obtain a matrix called "optimized parity matrix",
  an application of a belief propagation algorithm using the optimized parity matrix and the sequence of log-likelihood ratios associated with the symbols of the block of data to determine a bit stream corresponding to the block of data in the message.

For low noise ratio levels (for example less than 13 dB), the synchronization phase of the reception method according to the invention has better detection performance of an ADS-B message than conventional methods based on a signal correlation.

The different steps of the decoding phase of the reception method according to the invention allow to optimize the parity matrix of the cyclic redundancy check code by reducing its density, so that it becomes possible to use a belief propagation algorithm to correct any errors during the decoding of the block of data in the message. A cyclic redundancy check code is conventionally not well adapted for the use of such an algorithm because the parity matrix associated therewith is too dense.

In particular embodiments, the invention may also include one or more of the following features, taken in isolation or in any technically possible combination.

In particular embodiments, during the synchronization phase, the selected candidate sequences correspond to the sequences including the largest absolute values of log-likelihood ratios among all the log-likelihood ratios of all the determined sequences.

In particular embodiments, during the synchronization phase, the candidate sequences selected correspond to the sequences for which the sums of the absolute values of the log-likelihood ratios are the greatest.

In particular embodiments, the starting sample is determined as the sample associated with the candidate sequence for which the calculated likelihood value is the greatest.

In particular embodiments, the synchronization phase of the reception method further includes a discrimination between different candidate sequences using parts of the preamble not including a pulse.

In particular embodiments, the discrimination between different candidate sequences includes a calculation of a sum, for each candidate sequence:
- for each symbol of said candidate sequence assumed to correspond to a symbol of the preamble not including a pulse, of the values of half of the samples having the greatest values,
- for each symbol of said candidate sequence assumed to correspond to a symbol of the preamble including a pulse, of the values of half of the samples having the lowest values,
- the candidate sequences for which the sums thus calculated are the lowest being considered as the most likely.

In particular embodiments, the decoding phase of the reception method further includes a discrimination between different possible bit streams obtained at the output of the belief propagation algorithm for the block of data in the message based on the Hamming distance between a possible bit stream and a bit stream corresponding to the sequence of log-likelihood ratios associated with the symbols of the block of data.

According to a second aspect, the present invention relates to a device for receiving an automatic dependent surveillance-broadcast (ADS-B) message. Such a message is carried by a radio signal and includes a preamble and a block of data encoded by symbols modulated by pulse position. The block of data includes a cyclic redundancy check (CRC) code. The receiving device includes a synchronization module configured to detect the start of the message, and a decoding module configured to recover a bit stream corresponding to the block of data in the message.

The synchronization module is configured for:
- sampling the radio signal with a sampling frequency at least equal to twice the emission frequency of the symbols of the message,
- for each sample of a predetermined number of successive samples, determining a sequence of log-likelihood ratios, each log-likelihood ratio corresponding to a ratio between the respective probabilities that a symbol of the signal received corresponds to one of two possible values for a symbol, each sequence being determined by assuming that said sample corresponds to the start of the message,
- selecting candidate sequences based on the values of log-likelihood ratios of said sequences thus determined, each candidate sequence being associated with a candidate sample which may correspond to the start of the message,
- for each selected candidate sequence, calculating a likelihood value between said candidate sequence and a sequence of symbols expected for the preamble,
- determining based on the likelihood values thus calculated, a sample, called the "starting sample", corresponding to the start of the message.

The decoding module is configured for:
- determining, from the starting sample, a sequence of log-likelihood ratios associated respectively with the symbols of the block of data in the message,
- ordering the sequence of log-likelihood ratios associated with the symbols of the block of data in ascending order in absolute value,
- permuting columns of a parity matrix of the cyclic redundancy check code, said permutation being carried out in a coherent manner with the permutations carried out to order the sequence of log-likelihood ratios, in order to obtain a matrix called a "permuted matrix",
- transforming the permuted matrix by a reduction in scaled form of a sub-part of the permuted matrix, in order to obtain a matrix called "transformed matrix",
- reversely permuting the columns of the transformed matrix to return the columns to their initial order, in order to obtain a matrix called "optimized parity matrix",
- applying a belief propagation algorithm using the optimized parity matrix and the sequence of log-likelihood ratios to determine a bit stream corresponding to the block of data in the message.

PRESENTATION OF THE FIGURES

Figure 2:
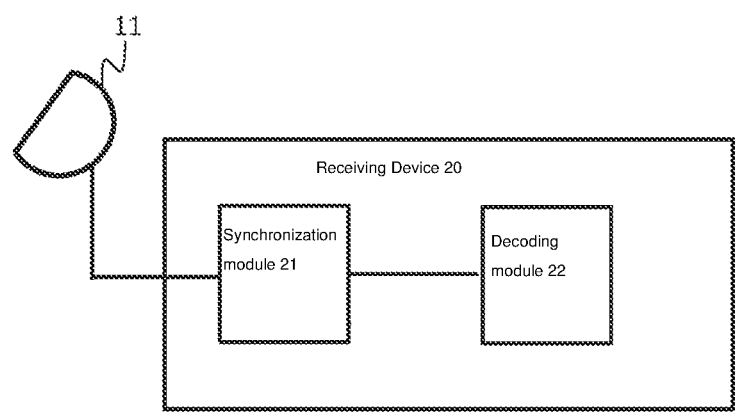
Figure 3:
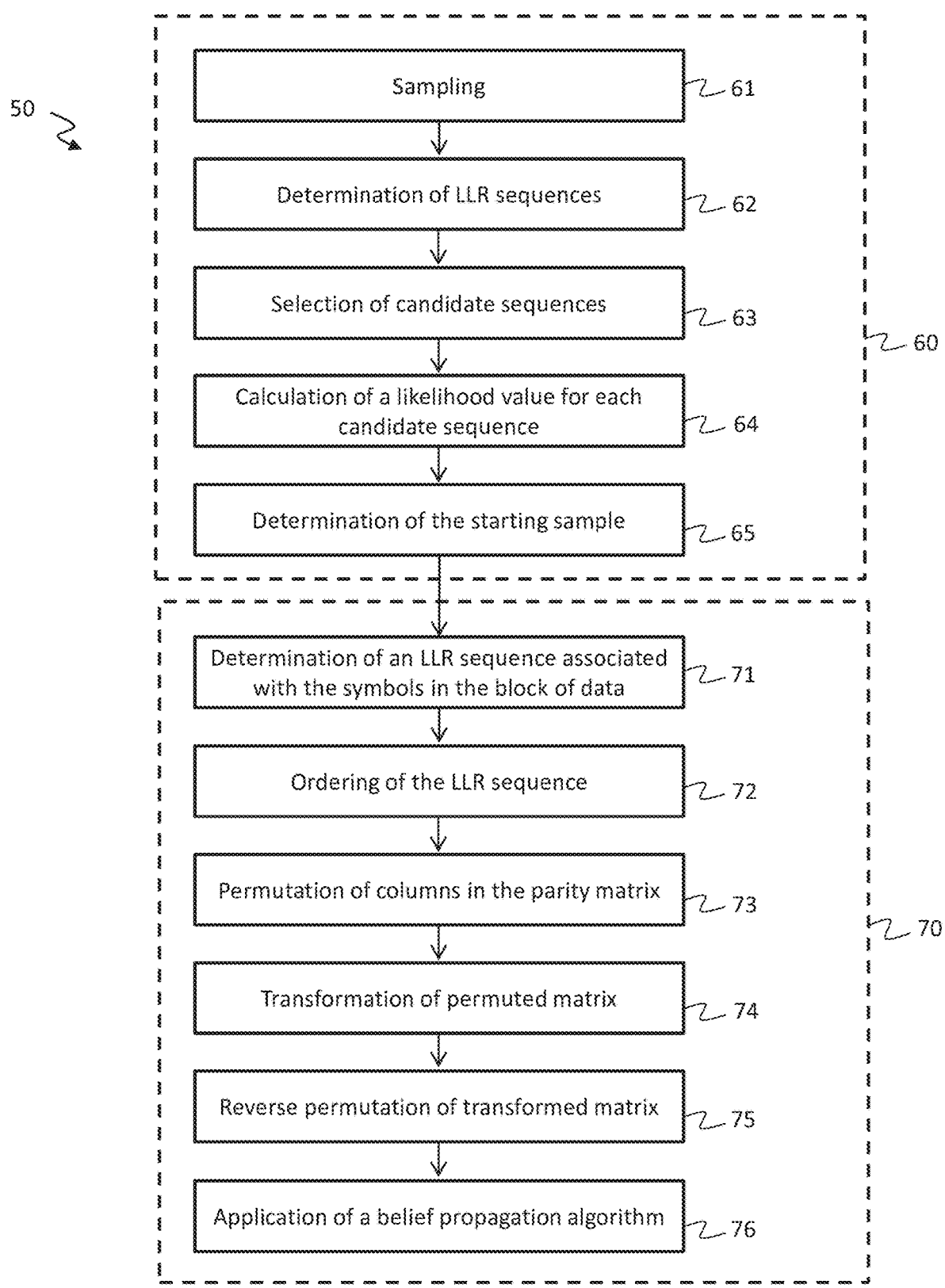
Figure 4:
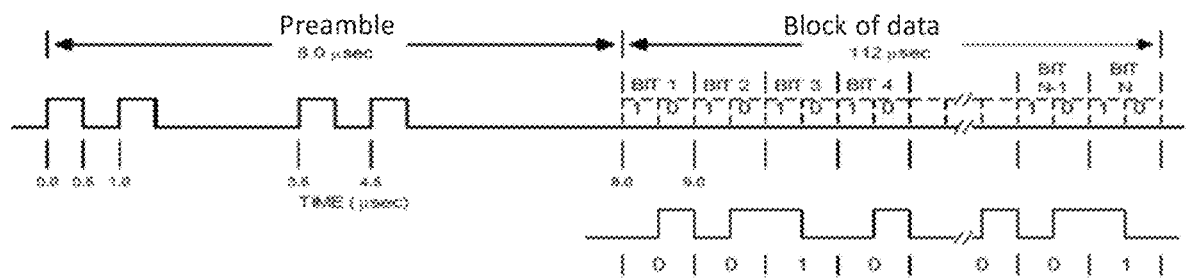
Figure 5:
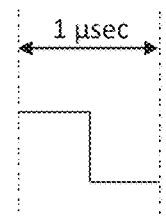
Figure 6:
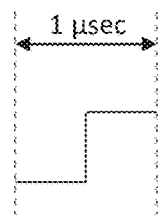
Figure 7:
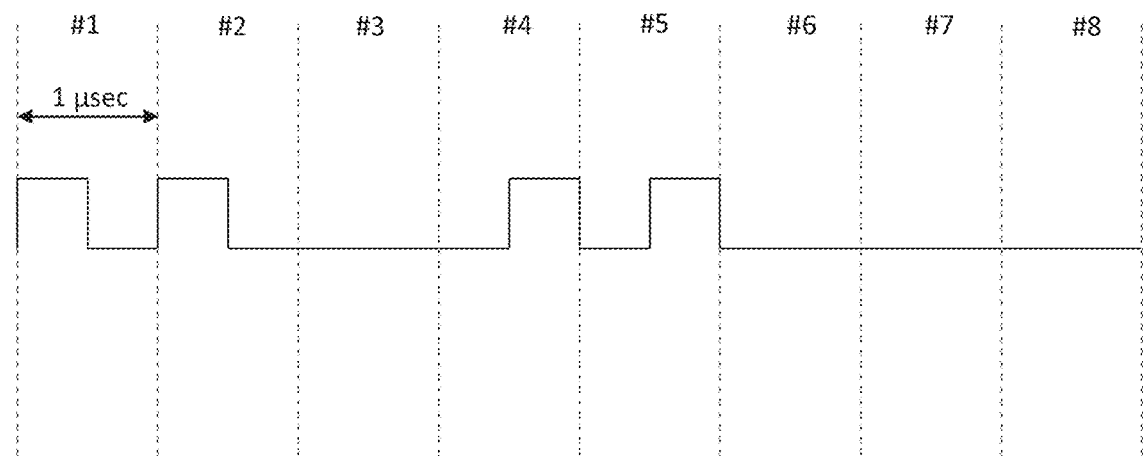
Figure 8:
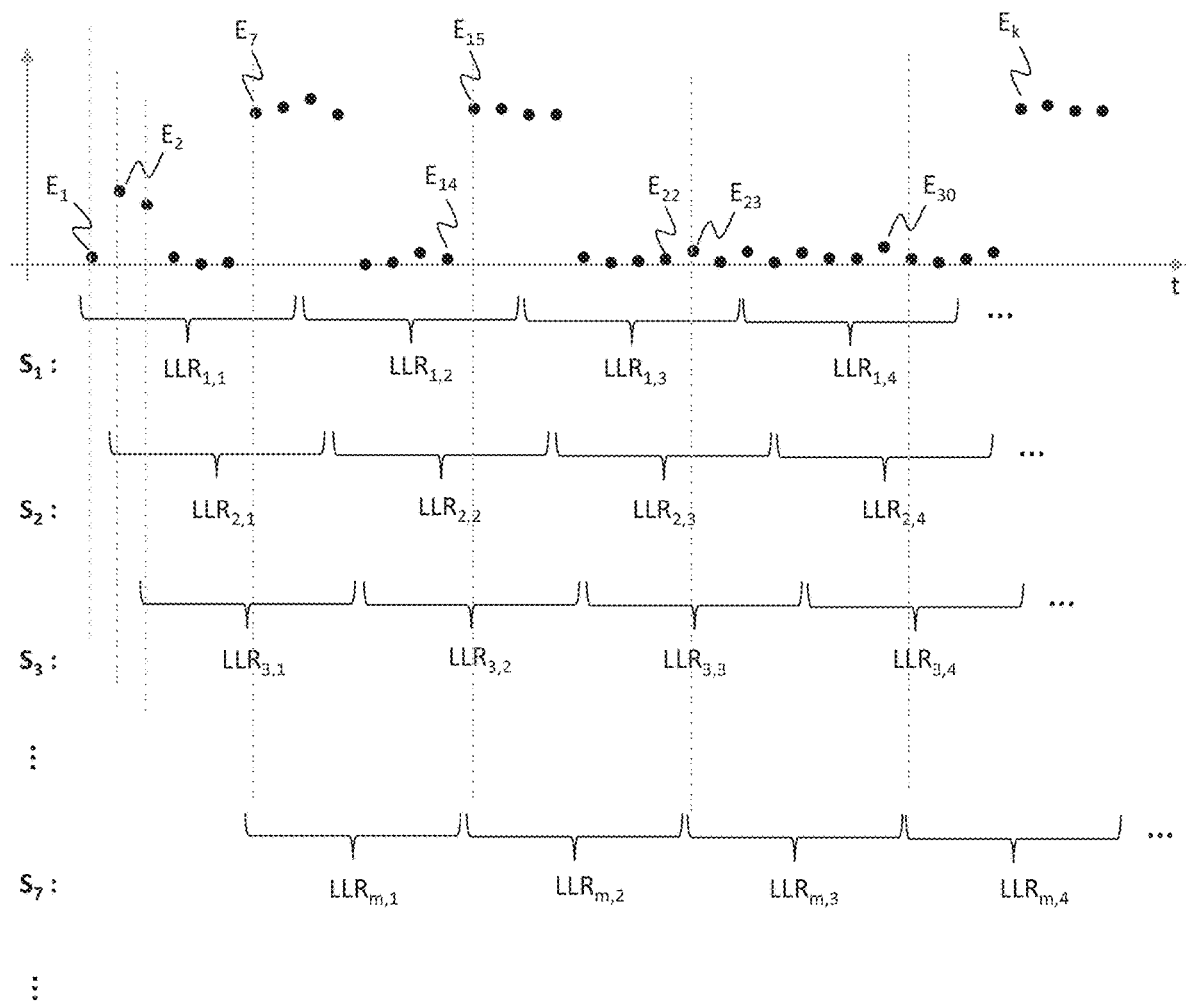
Figure 9:
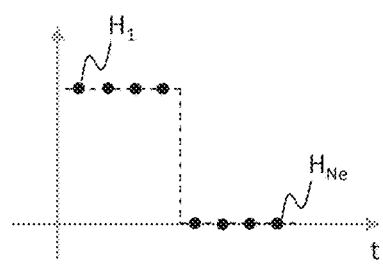
Figure 10:
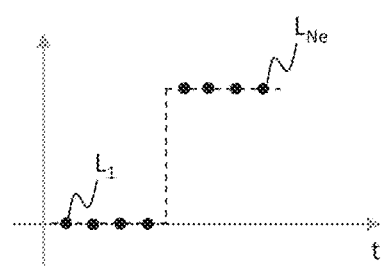
Figure 11:
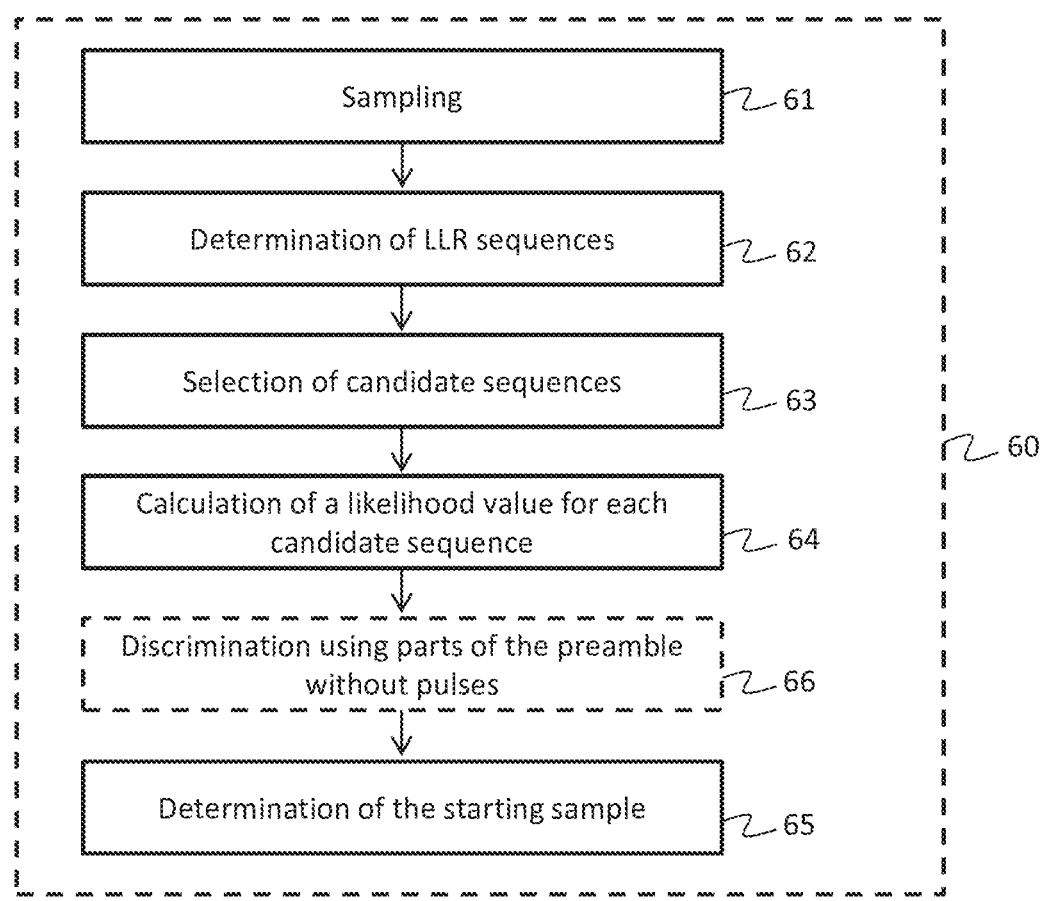
Figure 12:
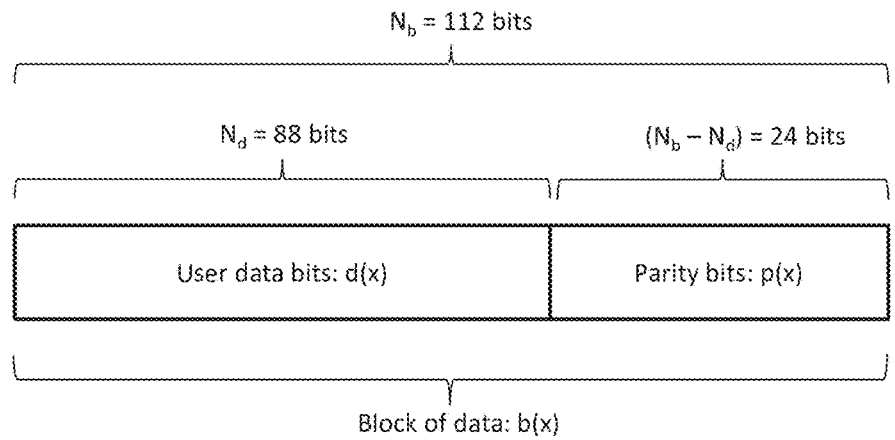
Figure 13:
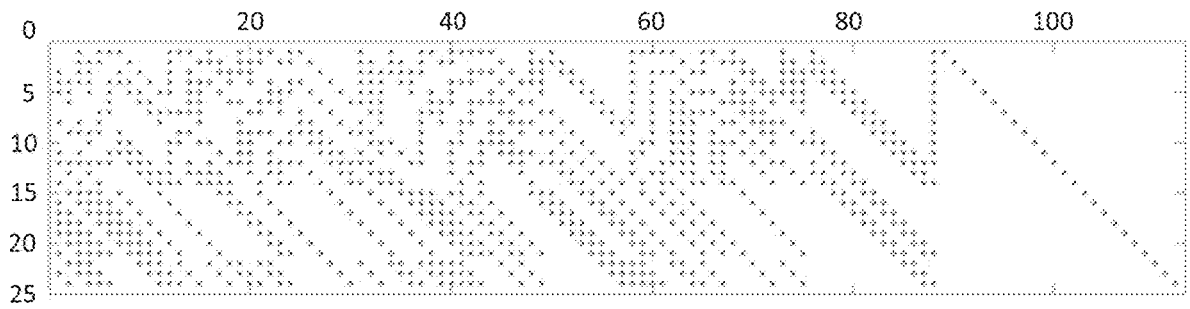
Figure 14:
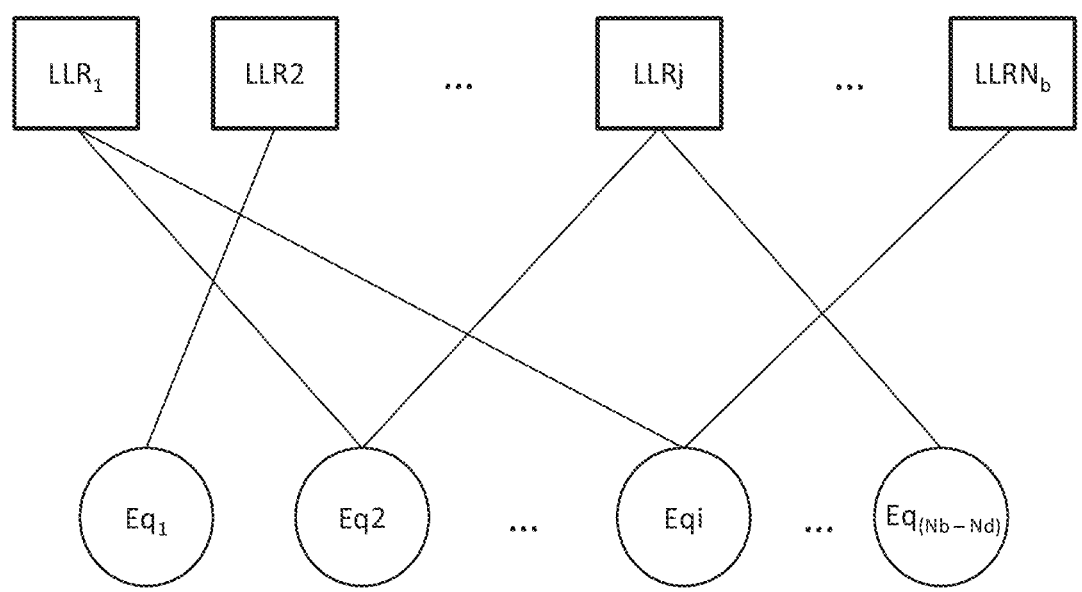
Figure 15:
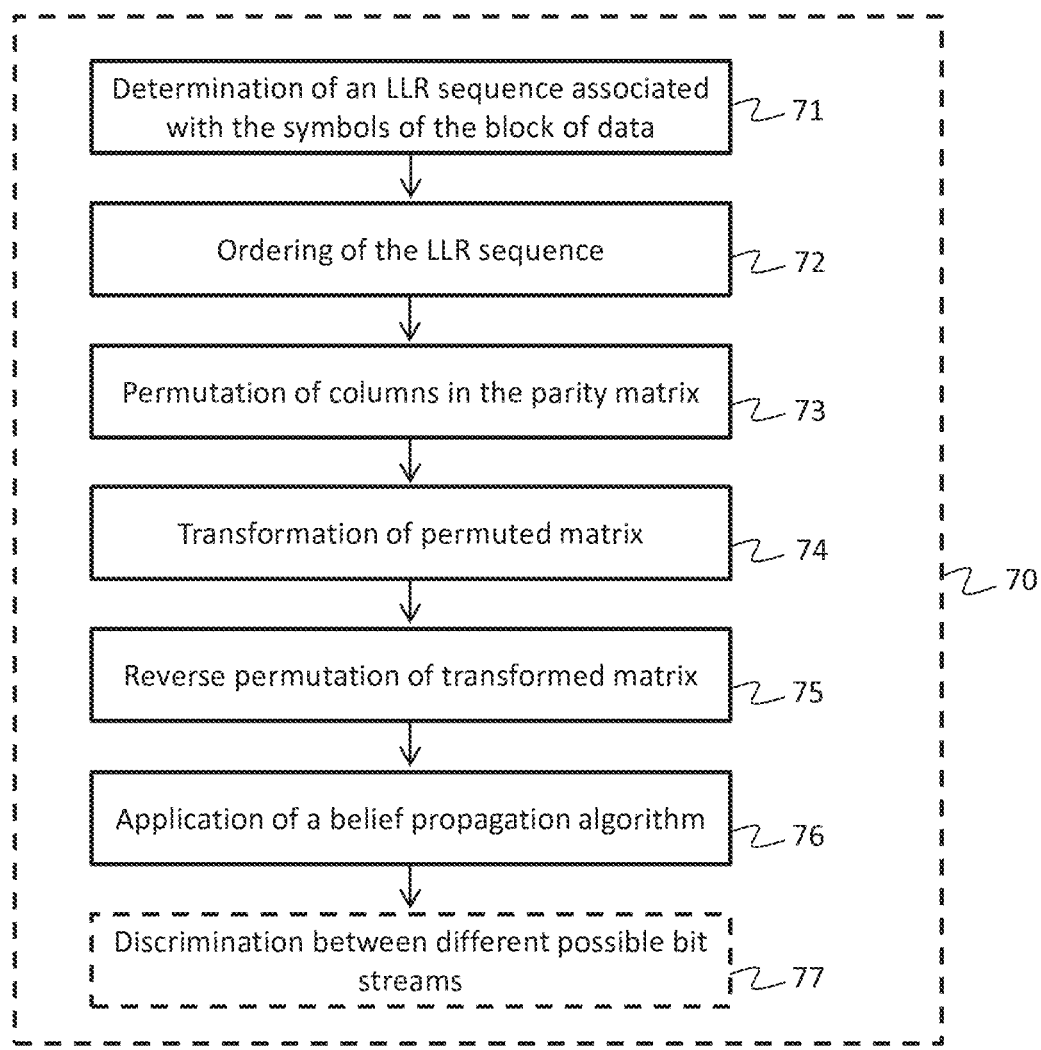
Figure 16:
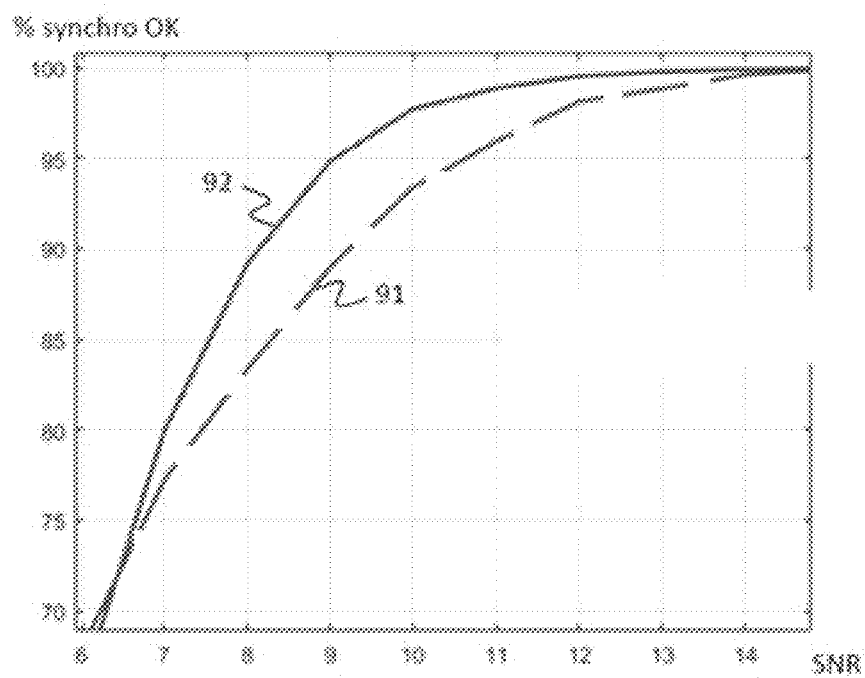
Figure 17:
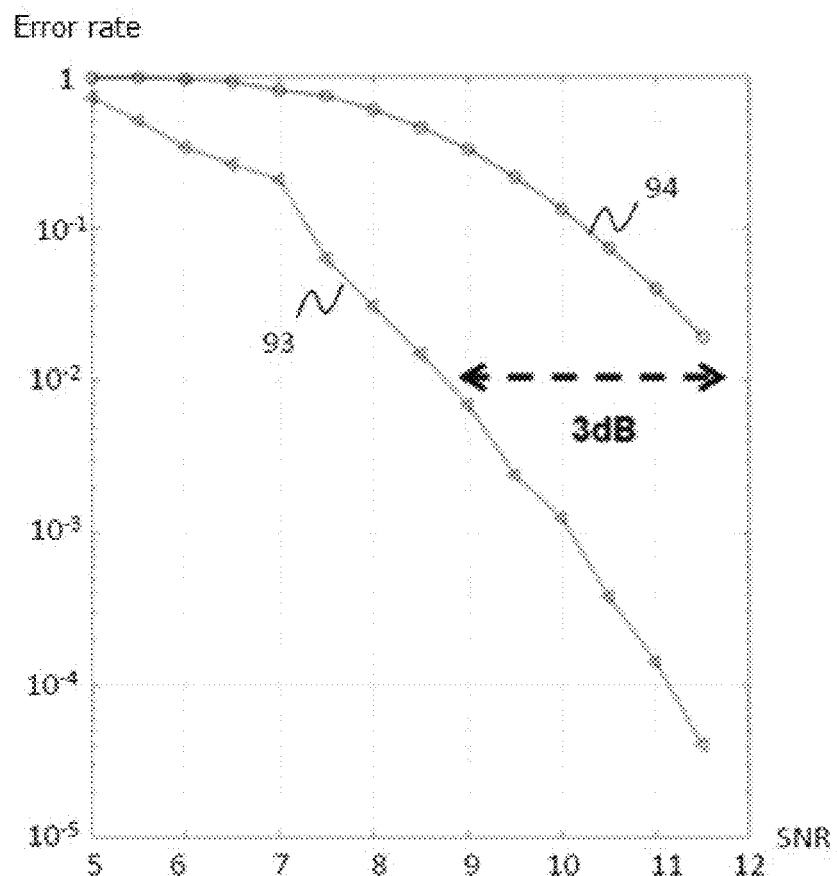

The invention will be better understood upon reading the following description, given by way of non-limiting example, and made with reference to FIGS. 1 to 17 which represent:

FIG. 1 schematically shows the reception via a satellite of an ADS-B message emitted by an aircraft, FIG. 2 schematically shows a device for receiving an ADS-B message according to the invention, FIG. 3 schematically shows the main steps of a method for receiving an ADS-B message according to the invention, FIG. 4 schematically shows the structure of an ADS-B message, FIG. 5 schematically shows a possible value of a symbol of an ADS-B message, FIG. 6 schematically shows another possible value of a symbol of an ADS-B message, FIG. 7 schematically shows the different symbols of a preamble of an ADS-B message, FIG. 8 schematically shows samples of a signal carrying an ADS-B message as well as sequences of log-likelihood ratios calculated from these samples, FIG. 9 schematically shows the samples of a matched filter associated with the symbol shown in FIG. 5, FIG. 10 schematically shows the samples of a matched filter associated with the symbol shown in FIG. 6, FIG. 11 schematically shows the main steps of a particular embodiment of the synchronization phase of the reception method according to the invention, FIG. 12 schematically shows the structure of a block of data of an ADS-B message, FIG. 13 schematically shows the parity matrix of the cyclic redundancy code of an ADS-B message, FIG. 14 schematically shows a bipartite graph on which is based a belief propagation algorithm used in the decoding phase of the reception method according to the invention, FIG. 15 schematically shows the main steps of a particular embodiment of the decoding phase of the reception method according to the invention, FIG. 16 shows the correct synchronization rate of an ADS-B message as a function of the signal-to-noise ratio for the reception method according to the invention and for a conventional method, FIG. 17 shows the decoding error rate of an ADS-B message as a function of the signal-to-noise ratio for the reception method according to the invention and for a conventional method.

In these figures, identical references from one figure to another designate identical or similar elements. For reasons of clarity, the elements shown are not necessarily on the same scale, unless otherwise indicated.

DETAILED DESCRIPTION OF AN EMBODIMENT OF THE INVENTION

As indicated above, the present invention aims in particular at providing a solution allowing to synchronize and decode an ADS-B message transported by a radio signal for which the signal-to-noise ratio is particularly low.

FIG. 1 schematically shows a satellite 10 placed in orbit around the Earth and including a payload adapted to receive on a communication link 15 a radio signal carrying an automatic dependent surveillance-broadcast (ADS-B) message emitted by an aircraft 12. In the remainder of the description, it is considered by way of non-limiting example that the satellite 10 is placed in Low Earth Orbit (or LEO). A low Earth orbit is an area of Earth's orbit of up to 2000 kilometers. A satellite moving in low earth orbit benefits for the communication link 15 from a better link balance than a satellite moving in Medium Earth Orbit (or MEO, orbit located between 2000 and 35786 kilometers altitude) or than a satellite moving in a geostationary orbit (or GEO, orbit located in the equatorial plane at an altitude of 35786 kilometers).

The payload of the satellite 10 includes an antenna 11 configured to receive the radio signal carrying the ADS-B message. The antenna 11 may for example include, in a conventional manner, an array of antennas allowing to form several beams.

As explained previously, the distance separating the satellite 10 from the aircraft 12 and the potentially large number of collisions between the message emitted by the aircraft 12 and other messages emitted simultaneously by other aircrafts and picked up by the same beam 14 have the consequence that the signal-to-noise ratio (SNR) is generally much lower for a radio signal carrying an ADS-B message received by the satellite 10 than for the same radio signal received by a ground station 18 on a link 16 of aircraft-station communication, or for the same radio signal received by another aircraft 13 on an aircraft-aircraft communication link 17.

The payload of the satellite 10 includes a device for receiving an ADS-B message. FIG. 2 schematically shows such a receiving device 20. The receiving device 20 includes in particular a synchronization module 21 configured to detect the start of an ADS-B message, and a decoding module 22 configured to recover a bit stream corresponding to a block of data of the ADS-B message.

To this end, the synchronization module 21 and the decoding module 22 include for example a processing circuit (not shown in the figures), including for example one or more processors and storage means (magnetic hard disk, electronic memory, optical disc, etc.) wherein a computer program product is stored, in the form of a set of program code instructions to be executed to implement the steps of a method for receiving an ADS-B message. Alternatively or in addition, the processing circuit includes one or more programmable logic circuits (FPGA, PLD, etc.), and/or one or more specialized integrated circuits (ASIC), and/or a set of discrete electronic components, etc., adapted for implementing all or part of said steps.

The receiving device 20 is connected to the antenna 11 of the satellite and further includes a radio circuit (not shown in the figures) including equipment (amplifier, local oscillator, mixer, analog filter, analog/digital converter, etc.) known to the person skilled in the art, allowing said receiving device 20 to receive messages in the form of radio signals.

In other words, the radio-electric circuit, the synchronization module 21 and the decoding module 22 correspond to means of the receiving device 20 which are software (specific computer program product) and/or hardware (FPGA, PLD, ASIC, discrete electronic components, etc.) configured to implement the steps of a method for receiving an ADS-B message.

In the example considered, the synchronization module 21 and the module 22 for decoding a reception chain corresponding to an antenna beam are produced on programmable logic circuits of the FPGA type. The FPGA circuit can include several reception chains. In particular, in the example considered, the FPGA circuit includes nine reception chains corresponding respectively to nine different beams, and the payload of the satellite 10 includes four such FPGA circuits in order to support thirty-six different beams in all.

FIG. 3 schematically shows the main steps of a method 50 for receiving an ADS-B message by the receiving device 20. The method 50 includes in particular a synchronization phase 60 for detecting the start of the message and a decoding phase 70 for recovering a bit stream corresponding to a block of data in the message. The steps of the synchronization phase 60 are implemented by the synchronization module 21. The steps of the decoding phase 70 are implemented by the decoding module 22.

The synchronization phase 60 in particular includes the following steps:

- a sampling 61 of the radio signal with a sampling frequency at least equal to twice the emission frequency of the symbols of the message,
- for each sample of a predetermined number of successive samples, a determination 62 of a sequence of log-likelihood ratios, each log-likelihood ratio corresponding to a ratio between the respective probabilities that a symbol of the signal received corresponds to one of two possible values for a symbol, each sequence being determined by assuming that said sample corresponds to the start of the message,
- a selection 63 of candidate sequences based on the values of log-likelihood ratios of said sequences thus determined, each candidate sequence being associated with a candidate sample which may correspond to the start of the message, for each selected candidate sequence, a calculation 64 of a likelihood value between said candidate sequence and a sequence of symbols expected for the preamble, a determination 65, based on the likelihood values thus calculated, of a sample, called the "starting sample", corresponding to the start of the message.

The decoding phase 70 in particular includes the following steps:

a determination 71, from the starting sample, of a sequence of log-likelihood ratios associated respectively with the symbols of the block of data in the message, an ordering 72 of the sequence of log-likelihood ratios associated with the symbols of the block of data in ascending order in absolute value, a permutation 73 of the columns of a parity matrix of the cyclic redundancy check code, said permutation 73 being carried out in a coherent manner with the permutations carried out to order the sequence of log-likelihood ratios, in order to obtain a matrix called "permuted matrix", a transformation 74 of the permuted matrix by reduction in scaled form of a sub-part of said permuted matrix, in order to obtain a matrix called "transformed matrix", a reverse permutation 75 of the columns of the transformed matrix to return the columns to their initial order, in order to obtain a matrix called "optimized parity matrix", an application 76 of a belief propagation algorithm using the optimized parity matrix and the sequence of log-likelihood ratios to determine a bit stream corresponding to the block of data in the message.

FIG. 4 schematically shows the structure of an ADS-B message. The message includes a preamble and a block of data. The preamble and the block of data are coded by symbols modulated by pulse position ("Pulse-Position Modulation" or PPM).

As illustrated in FIGS. 5 and 6, a symbol corresponds for example to a transition of a signal from a high state to a low state, or else to a transition of the signal from a low state to a high state. FIG. 5 shows a symbol corresponding to a transition of the signal from a high state to a low state. The symbol has a duration of one microsecond (1 µs). The signal corresponding to this symbol has a pulse during the first half of the duration of the symbol, and an absence of a pulse during the second half of the duration of the symbol (in other words, the signal assumes a constant positive value during the first half of the duration of the symbol, and a zero value during the second half of the duration of the symbol). FIG. 6 shows a symbol corresponding to a transition of the signal from a low state to a high state. The signal corresponding to this symbol includes an absence of a pulse for the first half of the duration of the symbol, and a pulse for the second half of the duration of the symbol (in other words, the signal assumes a zero value during the first half of the duration of the symbol, and a constant positive value during the second half of the duration of the symbol). A value can be associated with each symbol. For example, the value 1 can be associated with the symbol shown in FIG. 5 and the value −1 can be associated with the symbol shown in FIG. 6.

FIG. 7 shows the preamble of an ADS-B message. The preamble has a duration of eight microseconds (8 µs). The preamble includes eight symbols. Symbols #1 and #2 correspond to the symbol shown in FIG. 5. Symbols #4 and #5 correspond to the symbol shown in FIG. 6. Symbols #3, #6, #7 and #8, in turn, do not include any pulse over the duration of the symbol (in other words, the signal keeps a zero value for the duration of the symbol). The value 0 can for example be associated with these symbols which do not include a pulse.

In the example considered, and as illustrated in FIG. 4, the block of data has a duration of one hundred and twelve microseconds (112 µs). The block of data corresponds to a stream of 112 bits, each bit being a binary element taking the value 0 or the value 1. In the example considered, a bit of value 1 is coded by the symbol of value 1 shown in FIG. 5, and a bit of value 0 is coded by the symbol of value −1 shown in FIG. 6. Unlike the preamble, the block of data does not include symbols of value 0 without a pulse. Among the 112 bits of the block of data, 88 bits correspond to user data, and 24 bits correspond to a cyclic redundancy check (or CRC) code. The cyclic redundancy check code is conventionally used to verify the integrity of the block of data after decoding (that is to say to verify that the decoded bit stream for the ADS-B message received by a receiver corresponds to the bit stream emitted by an emitter).

The radio signal carrying the ADS-B message is for example transmitted on a carrier frequency of 1090 MHz. A pulse then corresponds to a period of a duration of 0.5 µs during which the carrier frequency is emitted with a certain power. An absence of a pulse corresponds to a period during which the carrier frequency is not emitted. The radio signal received by the receiver device 20 is then brought back to baseband and sampled, in a conventional manner, by the synchronization module 21.

The radio signal sampling step 61 allows to obtain samples $E_k$ as illustrated in FIG. 8. The amplitude of the samples is represented on the ordinate and time is represented on the abscissa. Sampling is carried out with a sampling frequency at least equal to twice the frequency of emission of the symbols of the message (oversampling factor at least equal to two). In baseband, the symbols of the message are emitted at a frequency of 1 MHz (one symbol per microsecond). In a preferred embodiment, the oversampling factor is equal to eight, that is to say, the sampling frequency is equal to eight times the emission frequency of the symbols of the message. In other words, eight samples are obtained for each symbol. In the example considered, the sampling frequency is then 8 MHz. In the remainder of the description, and as illustrated in FIG. 8, it is considered by way of non-limiting example that the oversampling factor is equal to eight.

The objective of the synchronization phase 60 is to detect the sample, called the "starting sample" which corresponds to the first sample of the first symbol of the preamble of the ADS-B message. In the example shown in FIG. 8, the starting sample is sample $E_7$. Samples $E_7$ to $E_{14}$ correspond to the first symbol of the preamble, samples $E_{15}$ to $E_{22}$ correspond to the second symbol of the preamble, samples $E_{24}$ to $E_{30}$ correspond to the third symbol of the preamble, and so on.

It should be noted that a power detection step can precede the synchronization phase 60. A sliding time window of a predetermined duration is for example used. By Fourier transform, it is then possible to determine, for said time window, a power spectral density in a frequency band of interest, for example in an 8 MHz wide band centered on the carrier frequency of 1090 MHz of the radio signal. If the power spectral density is greater than a predetermined threshold, then a synchronization phase 60 is triggered on the part of the signal comprised in this time window.

In step 62, for each sample of a predetermined number of successive samples, a sequence of log-likelihood ratios is determined. In FIG. 8, the sequence $S_1$ is associated with the sample $E_1$, the sequence $S_2$ is associated with the sample $E_2$, the sequence $S_3$ is associated with the sample $E_3$, . . . , the sequence $S_7$ is associated with the sample $E_7$, etc. Each sequence includes log-Likelihood ratios (LLR) for successive symbols determined by assuming that the sample with which said sequence is associated corresponds to the start of the message. Each symbol corresponds to eight successive samples.

Each log-likelihood ratio corresponds to a ratio between the probability that a symbol of the signal received corresponds to the symbol of value 1 shown in FIG. 5 and the probability that said symbol corresponds to the symbol of value −1 shown in FIG. 6.

In the remainder of the description, the number of samples per symbol is denoted $N_e$ ($N_e$ is the oversampling factor, $N_e$=8 in the example considered). Thus, the element of index j in the sequence $S_i$ of index i corresponds to the log-likelihood ratio $LRR_{i,j}$, such that:

$$LLR_{i,j} = \text{Log}\left(\frac{P_{i,j}^1}{P_{i,j}^{-1}}\right) \quad \text{[Math. 1]}$$

$P_{i,j}^1$ is the probability that the symbol corresponding to the $N_e$ samples $E_{i+(j-1)\cdot Ne}$ to $E_{i+j\cdot Ne-1}$ correspond to a symbol of value 1.

$P_{i,j}^{-1}$ is the probability that the symbol corresponding to the $N_e$ samples $E_{i+(j-1)\cdot Ne}$ to $E_{i+j\cdot Ne-1}$ correspond to a symbol of value −1.

FIGS. 9 and 10 respectively represent the matched filters for the symbols of value 1 and −1. The samples $H_1$ to $H_{Ne}$ thus represent a template of the symbol of value 1 and the samples $L_1$ to $L_{Ne}$ represent a template of the symbol of value −1. The probabilities $P_{i,j}^1$ and $P_{i,j}^{-1}$ can then be written in the form:

$$P_{i,j}^1 = \frac{1}{C} \cdot \sum_{k=1}^{N_e} E_{i+(j-1)\cdot N_e+(k-1)} \cdot H_k \quad \text{[Math. 2]}$$

$$P_{i,j}^{-1} = \frac{1}{C} \cdot \sum_{k=1}^{N_e} E_{i+(j-1)\cdot N_e+(k-1)} \cdot L_k \quad \text{[Math. 3]}$$

where C is a normalization constant.

The positive or negative sign of the log-likelihood ratio $LLR_{i,j}$ indicates whether the observed symbol has a value of 1 or −1. The greater the absolute value of the log-likelihood ratio $LLR_{i,j}$, the greater the confidence in the decision on the value of the symbol.

During this synchronization phase 60, the number of sequences $S_i$ considered corresponds to the number of successive samples considered. The number of log-likelihood ratios $LLR_{i,j}$ comprised in each sequence $S_i$ can for example correspond to the number $N_p$ of symbols of the preamble ($N_p$=8). The number of sequences $S_i$ considered can for example be equal to $N_p \times N_e$, that is to say sixty-four in the example considered ($N_p \times N_e$=64).

In step 63, candidate sequences are selected from the various sequences $S_i$ thus determined. The selection is made based on the values of the log-likelihood ratios $LLR_{i,j}$ of said sequences. As indicated above, each candidate sequence $S_j$ is associated with a candidate sample $E_j$ which may correspond to the start of the message.

In particular embodiments, the selected candidate sequences correspond to the sequences including the largest absolute values of log-likelihood ratios among all the log-likelihood ratios of all the determined sequences.

In particular embodiments, the selected candidate sequences correspond to the sequences for which the sums of the absolute values of the log-likelihood ratios are the largest.

The number of candidate sequences selected during step 63 is not necessarily fixed. This number can be adapted according to the results obtained for the log-likelihood ratios of the different sequences. For example, a sequence $S_i$ is selected as a candidate sequence only if the maximum value among the absolute values of the log-likelihood ratios $LLR_{i,j}$ is greater than a predefined threshold, or if the sum of the absolute values of the log-likelihood ratios is greater than a predefined threshold. Alternatively, the number of selected candidate sequences can be predefined at a fixed value.

In step 64, for each candidate sequence thus selected, a likelihood value is calculated between said candidate sequence and a sequence of symbols expected for the preamble.

A log-likelihood ratio sequence $S_i$ can be written in the form:

$$S_i = (LLR_{i,1}, LLR_{i,2}, LLR_{i,3}, \ldots, LLR_{i,Np})$$

The sequence Seq of symbols expected for the preamble can be written in the form:

$$\text{Seq} = (\text{Seq}_1, \text{Seq}_2, \text{Seq}_3, \ldots, \text{Seq}_{Np}) = (1, 1, 0, -1, -1, 0, 0, 0)$$

The likelihood value $LV_i$ between a candidate sequence $S_i$ and the sequence Seq of symbols expected for the preamble can for example be calculated as follows:

$$LV_i = \sum_{k=1}^{N_p} Seq_k \cdot LLR_{i,k} \quad \text{[Math. 4]}$$

In step 65, the starting sample corresponding to the start of the message is determined based on the likelihood values $LV_i$ thus calculated.

In particular embodiments, the starting sample is determined as being the sample associated with the candidate sequence $S_i$ for which the calculated likelihood value $LV_i$ is the greatest.

With such arrangements, the synchronization phase 60 allows to detect the start of an ADS-B message in 99% of cases when the signal-to-noise ratio is approximately 11 dB. Such a rate of detection of the start of an ADS-B message is only achieved by the conventional methods of the prior art for a signal-to-noise ratio greater than 13 dB. The method 50 according to the invention therefore allows a gain of 2 dB compared to the methods of the prior art for synchronizing an ADS-B message.

FIG. 11 shows a particular embodiment of the synchronization phase 60. In addition to the steps already described above with reference to the synchronization phase 60 shown in FIG. 3, the synchronization phase 60 shown in FIG. 11 includes an additional step of discrimination 66 between several candidate sequences using parts of the preamble which do not include a pulse.

The parts of the preamble which do not include a pulse correspond on the one hand to the symbols #3, #6, #7 and #8 of the preamble as well as to the halves of the symbols #1, #2, #4 and #5 which do not include a pulse (see FIG. 7).

This discrimination step 66 includes for example the calculation of a sum of the following elements for each candidate sequence:

- for each symbol of the candidate sequence assumed to correspond to a symbol of the preamble not including a pulse (symbols #3, #6, #7 and #8), the values of half of the samples having the greatest values,
- for each symbol of the candidate sequence assumed to correspond to a symbol of the preamble including a pulse (symbols ##1, ##2, #4 and #5), the values of half of the samples having the lowest values.

The candidate sequences for which the sums thus calculated are the lowest are considered as the most likely. This additional discrimination step 63 allows to further improve the performance of the receiving device 20 during the synchronization phase 60.

Once the starting sample corresponding to the start of the ADS-B message is determined, the phase 70 of decoding the bit stream corresponding to the block of data in the message can start. The decoding phase 70 of the reception method 50 according to the invention includes in particular an error correction based on a belief propagation algorithm which uses the cyclic redundancy check (CRC) code.

The belief propagation algorithm, also known under the term sum-product message transmission ("Sum-Product algorithm"), is a known decoding algorithm allowing to recover the useful information of a received message. This is an iterative-type algorithm particularly well adapted to linear error correcting codes for which the parity matrix has a low density (that is to say a parity matrix whose elements are for the major part 0, and for the minor part 1, for example the proportion of 1 on all the elements of the matrix is of the order of $10^{-3}$). The belief propagation algorithm is particularly well adapted to LDPC (acronym for "Low-Density Parity Check code") type codes.

A cyclic redundancy check (CRC) code is conventionally used to verify the integrity of transmitted data, and not to correct errors that have arisen in the transmission of data. A CRC code usually has a dense parity matrix, and such code is not well adapted for using a belief propagation algorithm. However, the decoding phase 70 of the reception method 50 according to the invention includes steps allowing to transform the parity matrix of the CRC code of an ADS-B message such that the use of the belief propagation algorithm becomes possible.

Conventionally, a CRC code is associated with a generator polynomial $g(x)$ which is known to both the sender and the receiver of a message. For user data $d(x)$, the parity bits $p(x)$ of the CRC correspond to the remainder of the division of said user data by the generator polynomial: $p(x)=d(x)/g(x)$. As a reminder, in the example considered, and as illustrated in FIG. 12, there are 88 data bits $d(x)$ and 24 parity bits $p(x)$. A block of data $b(x)$ of 112 bits then corresponds to the concatenation of the 88 user data bits with the 24 parity bits. It is then possible to detect the presence of an error when receiving a message by comparing the remainder of the division of the received block of data $b'(x)$ by $g(x)$. If the remainder is not zero, then it means that an error is detected.

In the case of ADS-B, the CRC generator polynomial is:

$g(x)=1+x^3+x^{10}+x^{12}+x^{13}+x^{14}+x^{15}+x^{16}+x^{17}+x^{18}+x^{19}+x^{20}+x^{21}+x^{22}+x^{23}+x^{24}$ [Math. 5]

It should be noted that we are working in the Galois field GF(2) including two elements, namely the elements 0 and 1. In GF(2), an addition corresponds to the operation "logical OR" (XOR) and a multiplication corresponds to the "logical AND" (AND) operation.

The number of bits in the block of data of an ADS-B message ($N_b$=112) is denoted $N_b$, and the number of user data bits included in said block of data ($N_d$=88) is denoted $N_d$.

The CRC generation matrix is the matrix $G=[g_{i,j}]$ such that for user data $d=(d_1, d_2, \ldots, d_{Nd})$, the block of data $b=(b_1, b_2, \ldots, b_{Nb})$ is such that $b=d \cdot G$.

It is possible to determine the generation matrix $G=[g_{i,j}]$ of the CRC by solving the following system of linear equations by generating at least $(N_b+1)$ different blocks of data:

$$\sum_{i=1}^{N_d} d_{k,i} \cdot g_{i,j} = b_{k,j}$$ [Math. 6]

The generation matrix $G=[g_{i,j}]$ includes $N_d$ rows and $N_b$ columns. G can be written as $G=[I|P]$, where I is the Identity matrix, and P is a matrix including $N_d$ rows and $(N_b-N_d)$ columns.

The parity matrix H is the core of the generation matrix G, which means that $G \cdot H^T=0$ ($H^T$ is the transpose of the matrix H). In other words, for a block of data $b=(b_1, b_2, \ldots, b_{Nb})$, we have $b \cdot H^T=0$ or $H \cdot b^T=0$. It is known that the parity matrix H associated with the CRC is the matrix $H=[P^T|I]$, where $P^T$ is the transpose of the matrix P. The parity matrix H of the CRC code includes $(N_b-N_d)$ rows and $N_b$ columns. The parity matrix H of the CRC code is shown in FIG. 13. In FIG. 13, each point in the matrix corresponds to a 1, and an absence of a point for an element of the matrix corresponds to a 0.

The decoding phase 70 includes a step 71 of determining, from the starting sample, a sequence of log-likelihood ratios associated respectively with the symbols of the block of data in the message. If the starting sample is the sample $E_{N0}$ of index $N_0$, then the first sample of the first symbol of the block of data is the sample $E_{N0+Np \cdot Ne}$ of index $(N_0+N_p \cdot N_e)$. The sequence includes one hundred and twelve (112) log-likelihood ratios associated respectively with the symbols of the block of data in the message. Each log-likelihood ratio is calculated in a manner similar to what was done previously for the symbols of the preamble during the synchronization phase 60.

The sequence of log-likelihood ratios associated respectively with the symbols of the block of data in the message is denoted $S_B$. A log-likelihood ratio of index n of the sequence $S_B$ is denoted $LLR_n$. $N_b$ is the number of symbols in the block of data in the message ($N_b$=112). Then the sequence $S_B$ is written in the form $S_B=(LLR_1, LLR_2, LLR_3, \ldots, LLR_{Nb})$ with:

$$LLR_n = \mathrm{Log}\left(\frac{P_n^1}{P_n^{-1}}\right)$$ [Math. 6]

$$P_n^1 = \frac{1}{C} \cdot \sum_{k=1}^{N_e} E_{N_0+N_p \cdot N_e+(n-1) \cdot N_e+(k-1)} \cdot H_k$$ [Math. 7]

-continued $$P_n^{-1} = \frac{1}{C} \cdot \sum_{k=1}^{N_e} E_{N_0 + N_p \cdot N_e + (n-1) \cdot N_e + (k-1)} \cdot L_k \quad \text{[Math. 8]}$$

The decoding phase 70 then includes a step 72 of ordering the sequence $S_B$ in ascending order in absolute value. In other words, the log-likelihood ratios $LLR_n$ of the sequence $S_B$ are ordered from the log-likelihood ratio having the lowest absolute value to the log-likelihood ratio having the greatest absolute value. In other words, the elements of the sequence $S_B$ are classified in ascending order of the confidence given to said element (as a reminder, the greater the absolute value of a log-likelihood ratio, the greater the confidence given to the decision on the value of the associated symbol, indicated by the sign of said ratio). The ordered sequence obtained is denoted $S_B'$.

In step 73, the columns of the parity matrix H of the cyclic redundancy check code are permuted in a coherent manner with the permutations performed to order the sequence $S_B$ of log-likelihood ratios. This means that the columns of the parity matrix H are permuted in the same way that the elements of the sequence $S_B$ were permuted. In other words, if an element $LLR_k$ at position k in the sequence $S_B$ is at position k' in the ordered sequence $S_B'$ after the ordering step 72, then the column k of the matrix H becomes the column k' of the permuted matrix after the permutation step 73. A mathematical operator corresponding to the permutation of the columns of the parity matrix H is denoted Π. The new position k' of a column of the permuted matrix corresponding to the column initially at the position k in the parity matrix is such that k'=Π(k).

The decoding phase 70 then includes a step 74 of transforming the permuted matrix by reduction in scaled form of a sub-part of said permuted matrix, in order to obtain a matrix called "transformed matrix". A matrix is said to be scaled if the number of zeros preceding the first non-zero value of a row increases row by row until there are possibly only zeros remaining.

For example, the square sub-matrix corresponding to the $(N_b-N_d)$ rows and to the $(N_b-N_d)$ first columns of the permuted matrix can be reduced to a scaled form by means of elementary row operations. Such a procedure is for example known as "Gaussian elimination".

The decoding phase 70 then includes a step 75 of reverse permutation of the columns of the transformed matrix to return the columns to their initial order, in order to obtain a matrix called "optimized parity matrix". In other words, the reverse operator $\Pi^{-1}$ is applied, so that, after the reverse permutation step 75, the new position $\Pi^{-1}(k')$ of a column of the optimized parity matrix corresponding to the column at position k' in the transformed matrix is the initial position k of the column in the original parity matrix.

The matrix obtained is an optimized parity matrix insofar as its density has been reduced. The reduction in scaled form of part of the permuted parity matrix has indeed allowed to reduce the proportion of 1 among all the elements of the matrix.

The decoding phase 70 finally includes an application 76 of a belief propagation algorithm using the optimized parity matrix and the sequence $S_B$ of log-likelihood ratios to determine a bit stream corresponding to the block of data in the message. This algorithm is applied in a conventional manner.

Steps 72 to 75 of the decoding phase 70 are equivalent to cutting some connections between variable nodes (the log-likelihood ratios $LLR_n$) and parity nodes (the parity equations) of a bipartite graph on which is based the belief propagation algorithm. Such a graph is illustrated in FIG. 14. On such a graph, a parity node $Eq_j$ is linked to a variable node $LLR_j$ if and only if the element in row i and column j of the parity matrix used is equal to 1. In particular, connections corresponding to log-likelihood ratios of low absolute value, for which beliefs are low, are deleted. This minimizes the impact of elements for which decision confidence is low over the belief propagation algorithm process. Thus, the graph is not polluted with too risky decisions.

With such arrangements, the decoding phase 70 allows to correctly decode the block of data of an ADS-B message in 99% of the cases when the signal-to-noise ratio is approximately 8.5 dB. Such a decoding rate of a block of data of an ADS-B message is only achieved by the conventional methods of the prior art for a signal-to-noise ratio of about 12 dB. The method 50 according to the invention therefore allows a gain of more than 3 dB compared to the methods of the prior art for decoding an ADS-B message.

FIG. 15 shows a particular embodiment of the decoding phase 70. In addition to the steps already described above with reference to the decoding phase 70 shown in FIG. 3, the synchronization phase 70 shown in FIG. 15 includes an additional step of discrimination 77 between several possible bit streams obtained at the output of the belief propagation algorithm applied in step 76 of the decoding phase 70 of the reception method 50.

Discrimination 77 is performed based on the Hamming distance between a candidate bit stream obtained at the output of the belief propagation algorithm, and a bit stream assumed corresponding to the sequence of log-likelihood ratios associated with the symbols of the block of data. Indeed, the belief propagation algorithm can result in several candidate bit streams satisfying the relationship $H' \cdot b^T = 0$ (H' being the optimized parity matrix and b being a candidate bit stream).

The Hamming distance between two bit streams of the same length is the number of bits for which the two bit streams are different.

The assumed bit stream corresponds to the sequence $S_B$ of log-likelihood ratios associated with the symbols of the block of data. It is obtained by considering that a log-likelihood ratio having a positive value corresponds to a bit of value 1 and that a log-likelihood ratio having a negative value corresponds to a bit of value 0.

For example, it is possible to eliminate a candidate bit stream (obtained at the output of the belief algorithm) which has a Hamming distance with the assumed bit stream (obtained from the sequence $S_B$) greater than $$\left\lfloor \frac{d_{min} - 1}{2} \right\rfloor$$

($d_{min}$ being the minimum Hamming distance of the CRC code, and $\lfloor A \rfloor$ corresponding to the integer lower part of A).

According to another example, it is possible, for example, to choose as the result of the decoding phase 70 the candidate bit stream (obtained at the output of the belief algorithm) which has the smallest Hamming distance with the assumed bit stream (obtained from the sequence $S_B$).

The above description clearly illustrates that, through its various features and their advantages, the present invention achieves the fixed objectives.

In particular, the synchronization phase 60 based on log-likelihood ratios for the symbols of the preamble allows to detect the start of an ADS-B message for a particularly low signal-to-noise ratio compared to what is possible to do with conventional methods for receiving an ADS-B message. Indeed, the conventional methods for synchronizing an ADS-B message are based on a conventional correlation between the received signal and a reference signal corresponding to the expected preamble. As the preamble is short and includes little power (the preamble includes only four pulses of 0.5 µs for a preamble duration of 8 µs), such a correlation can generate many false positives of detection when the signal-to-noise ratio is low (for example of the order of 8 dB).

In FIG. 16, the curve 91 represents a correct synchronization rate of an ADS-B message with a conventional correlation used in conventional methods. Curve 92 represents a correct synchronization rate of an ADS-B message with the synchronization phase 60 of the method 50 according to the invention. It can be seen in FIG. 16 that for an SNR of 8 dB, the synchronization phase 60 of the method 50 according to the invention allows to achieve a correct synchronization rate of about 90%, whereas a conventional method only allows to achieve a correct synchronization rate of approximately 83%.

On the other hand, the decoding phase 70 allows to take advantage of the CRC of the ADS-B message to correct any decoding errors of the block of data in the message. A CRC is conventionally not adapted for correcting decoding errors, but only for verifying the integrity of the decoded data. However, thanks to the various steps allowing to optimize the parity matrix of the CRC by reducing its density, the decoding phase 70 of the reception method 50 according to the invention allows to use a belief propagation algorithm based on said optimized parity matrix. Such arrangements allow to decode an ADS-B message even if it is received with a particularly low signal-to-noise ratio (for example of the order of 8 dB).

In FIG. 17, curve 94 represents an error rate of decoding a block of data of an ADS-B message with a conventional method using the CRC only to verify the integrity of the block of data. The curve 93 represents the decoding error rate with the decoding phase 70 of the method 50 according to the invention. It can be seen in FIG. 17 that for an SNR of 8 dB, the decoding phase 70 of the method 50 according to the invention allows to achieve a decoding error rate of the order of 2%, while a conventional method has a decoding error rate of about 60%.

In general, it should be noted that the implementations and embodiments considered above have been described by way of non-limiting examples, and that other variants can therefore be considered.

In particular, different choices can be considered for the oversampling factor of the signal, for the number of successive samples considered in the synchronization phase 60, for the number of candidate sequences selected and the manner in which said candidate sequences are selected based on the values of the log-likelihood ratios they include, etc. Such choices correspond only to variants of the invention.

It should also be noted that in the receiving method 50 according to the invention, the synchronization phase 60 and the decoding phase 70 may be independent of each other. In other words, it is conceivable to implement a method for receiving a message which includes the synchronization phase 60 according to the invention, and which includes a decoding phase different from the decoding phase 70 according to the invention, for example a conventional decoding method which does not use a belief propagation algorithm. Similarly, it is conceivable to implement a method for receiving a message which includes the decoding phase 70 according to the invention, and which includes a synchronization phase different from the synchronization phase 60 according to the invention, for example a conventional synchronization method based on a signal correlation. The same applies for the synchronization module 21 and the detection module 22: these two modules are independent of each other. It is thus conceivable to produce a receiving device 20 which includes a synchronization module 21 according to the invention and a decoding module different from the decoding module 22 according to the invention. Similarly, it is conceivable to produce a receiving device 20 which includes a decoding module 22 according to the invention and a synchronization module different from the synchronization module 21 according to the invention.

It should also be noted that it can be considered to adapt the invention to other wireless communication protocols using pulse position modulation and a cyclic redundancy check code.

The invention was described by way of example for a device 20 for receiving an ADS-B message on board a payload of a satellite in LEO orbit. However, nothing excludes applying the invention to a satellite in MEO orbit, or even in GEO orbit, if the performances of the antennas of said satellites allow such a message to be received. Nothing excludes either applying the invention to other receivers such as for example a ground station or another aircraft.

The invention claimed is:

1. A method for receiving an automatic dependent surveillance-broadcast message, or ADS-B message, said message being transported by a radio signal and including a preamble and a block of data encoded by symbols modulated by pulse position, the block of data including a cyclic redundancy check code, said reception method including a synchronization phase for detecting the start of the message, and a decoding phase for recovering a bit stream corresponding to the block of data in the message, wherein:

the synchronization phase includes:
a sampling of the radio signal with a sampling frequency at least equal to twice the emission frequency of the symbols of the message,
for each sample among a predetermined number of successive samples, a determination of a sequence of log-likelihood ratios, each log-likelihood ratio corresponding to a ratio between the respective probabilities that a symbol of the received signal corresponds to one of two possible values for a symbol, each sequence being determined by assuming that said sample corresponds to the start of the message,
a selection of candidate sequences based on the values of log-likelihood ratios of said sequences thus determined, each candidate sequence being associated with a candidate sample which may correspond to the start of the message,
for each selected candidate sequence, a calculation of a likelihood value between said candidate sequence and a sequence of symbols expected for the preamble,
a determination based on the likelihood values thus calculated, of a sample, called the "starting sample", corresponding to the start of the message, the decoding phase includes:
a determination, from the starting sample, of a sequence of log-likelihood ratios associated respectively with the symbols of the block of data in the message, an ordering of the sequence of log-likelihood ratios associated with the symbols of the block of data in ascending order in absolute value, a permutation of the columns of a parity matrix of the cyclic redundancy check code, said permutation being carried out in a coherent manner with the permutations carried out to order the sequence of log-likelihood ratios, in order to obtain a matrix called "permuted matrix", a transformation of the permuted matrix by reduction in scaled form of a sub-part of said permuted matrix, in order to obtain a matrix called "transformed matrix", a reverse permutation of the columns of the transformed matrix to return the columns to their initial order, in order to obtain a matrix called "optimized parity matrix", an application of a belief propagation algorithm using the optimized parity matrix and the sequence of log-likelihood ratios to determine a bit stream corresponding to the block of data in the message.

2. The method according to claim 1 wherein, during the synchronization phase, the selected candidate sequences correspond to the sequences including the largest absolute values of log-likelihood ratios among all the log-likelihood ratios of all the determined sequences.

3. The method according to claim 1 wherein, during the synchronization phase, the selected candidate sequences correspond to the sequences for which the sums of the absolute values of the log-likelihood ratios are the largest.

4. The method according to claim 1, wherein the starting sample is determined as the sample associated with the candidate sequence for which the calculated likelihood value is the greatest.

5. The method according to claim 1, further including a discrimination between different candidate sequences using parts of the preamble not including a pulse.

6. The method according to claim 5 wherein the discrimination includes a calculation of a sum, for each candidate sequence:
- for each symbol of said candidate sequence assumed to correspond to a symbol of the preamble not including a pulse, of the values of half of the samples having the greatest values,
- for each symbol of said candidate sequence assumed to correspond to a symbol of the preamble including a pulse, of the values of half of the samples having the lowest values,
- the candidate sequences for which the sums thus calculated are the lowest being considered as the most likely.

7. The method according to claim 1, further including a discrimination between different possible bit streams obtained at the output of the belief propagation algorithm for the block of data in the message based on the Hamming distance between a possible bit stream and a bit stream corresponding to the sequence of log-likelihood ratios associated with the symbols of the block of data.

8. A device for receiving an automatic dependent surveillance-broadcast message, or ADS-B message, said message being transported by a radio signal and including a preamble and a block of data encoded by symbols modulated by pulse position, the block of data including a cyclic redundancy check code, said receiving device including a synchronization module configured to detect the start of the message, and a decoding module configured to recover a bit stream corresponding to the block of data in the message, wherein:

the synchronization module is configured for:
- sampling the radio signal with a sampling frequency at least equal to twice the emission frequency of the symbols of the message,
- for each sample among a predetermined number of successive samples, determining a sequence of log-likelihood ratios, each log-likelihood ratio corresponding to a ratio between the respective probabilities that a symbol of the received signal corresponds to one of two possible values for a symbol, each sequence being determined by assuming that said sample corresponds to the start of the message,
- selecting candidate sequences based on the values of log-likelihood ratios of said sequences thus determined, each candidate sequence being associated with a candidate sample which may correspond to the start of the message,
- for each selected candidate sequence, calculating a likelihood value between said candidate sequence and a sequence of symbols expected for the preamble,
- determining, based on the likelihood values thus calculated, a sample, called the "starting sample", corresponding to the start of the message, the decoding module is configured for:
- determining, from the starting sample, a sequence of log-likelihood ratios associated respectively with the symbols of the block of data in the message,
- ordering the sequence of log-likelihood ratios associated with the symbols of the block of data in ascending order in absolute value,
- permuting columns of a parity matrix of the cyclic redundancy check code, the permutation being carried out in a coherent manner with the permutations carried out to order the sequence of log-likelihood ratios, in order to obtain a matrix called "permuted matrix",
- transforming the permuted matrix by a reduction in scaled form of a sub-part of the permuted matrix, in order to obtain a matrix called "transformed matrix",
- reversely permuting the columns of the transformed matrix to return the columns to their initial order, in order to obtain a matrix called "optimized parity matrix",
- applying a belief propagation algorithm using the optimized parity matrix and the sequence of log-likelihood ratios to determine a bit stream corresponding to the block of data of the message.

9. A satellite payload including a receiving device according to claim 8.

* * * * *